Figure 1:
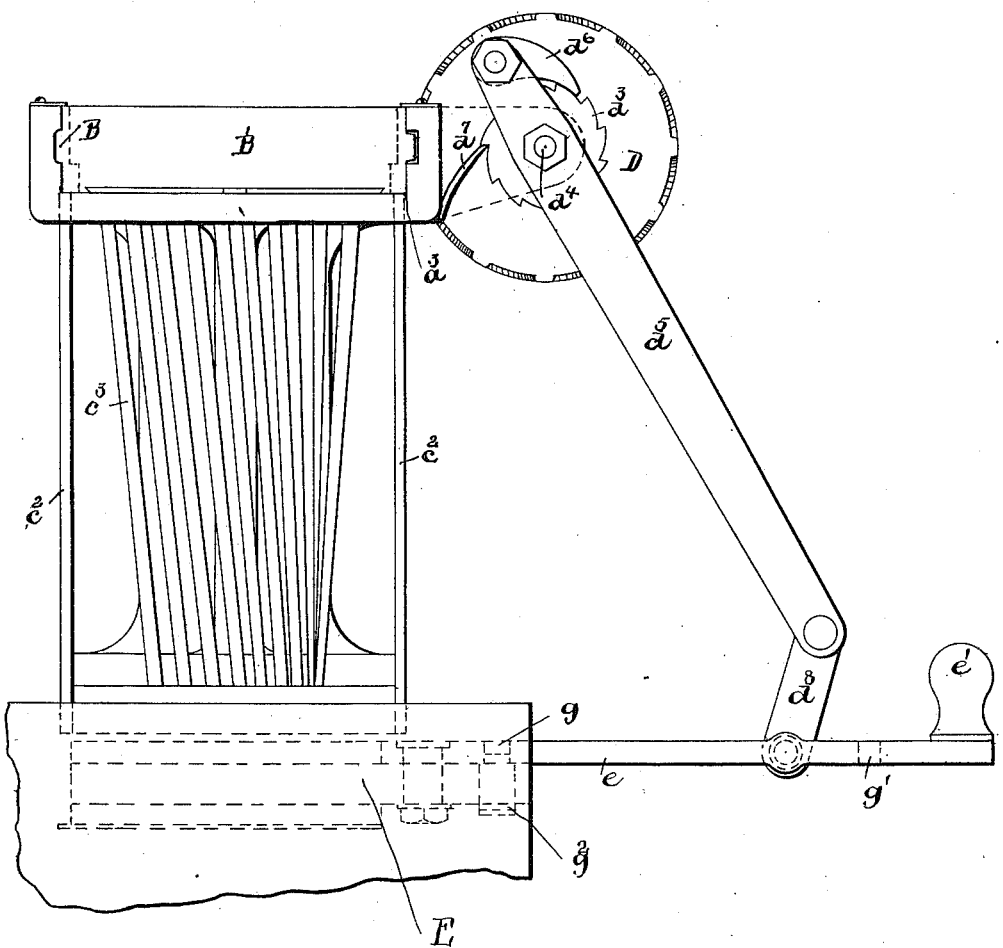

(No Model.)

F. F. RAYMOND, 2d.
NAIL DISTRIBUTING MACHINE.

No. 566,337. Patented Aug. 25, 1896.

WITNESSES

INVENTOR (No Model.)
F. F. RAYMOND, 2d.
NAIL DISTRIBUTING MACHINE.
No. 566,337.
6 Sheets—Sheet 4.
Patented Aug. 25, 1896.
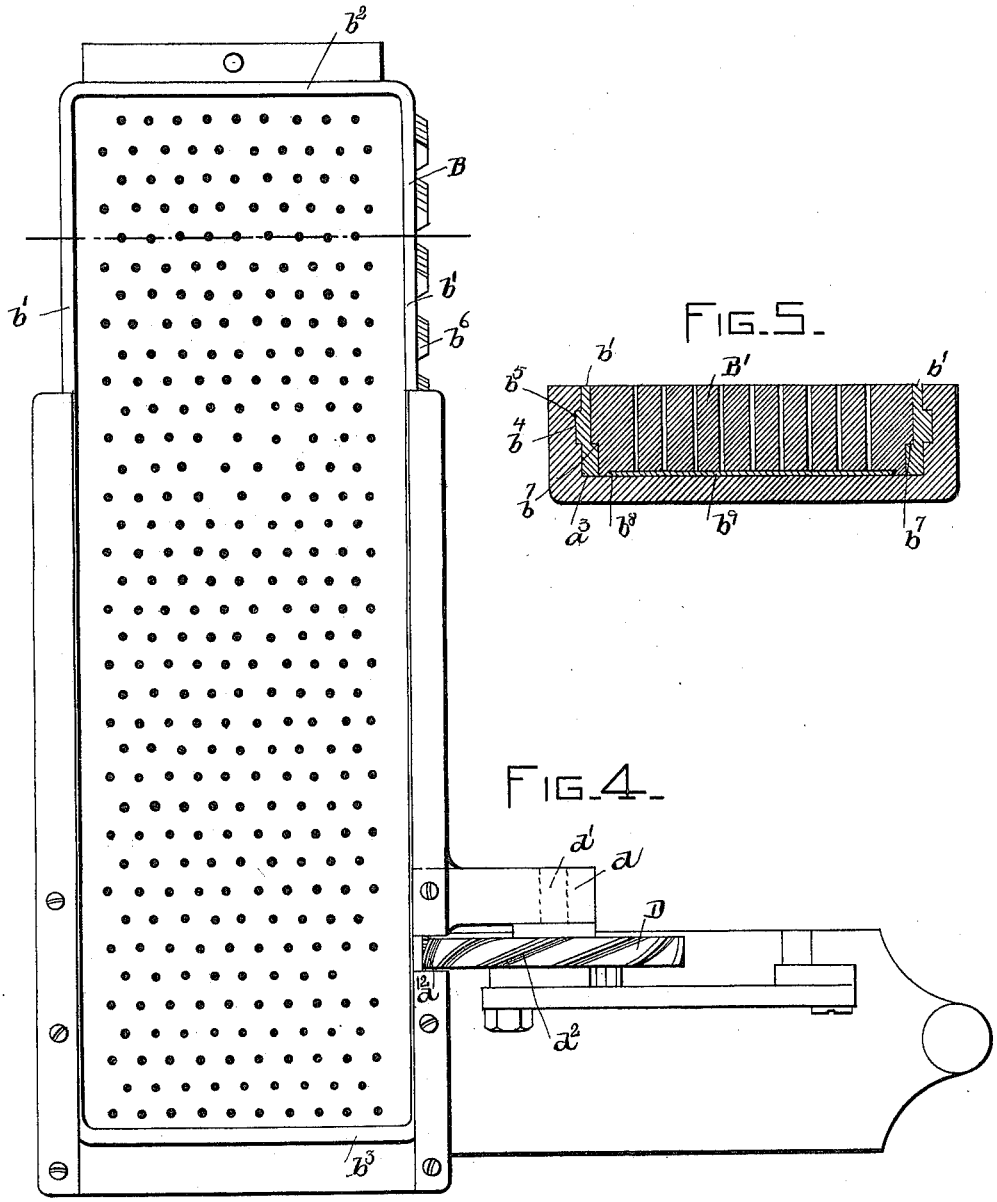
WITNESSES
INVENTOR (No Model.)  6 Sheets—Sheet 5.
F. F. RAYMOND, 2d.
NAIL DISTRIBUTING MACHINE.
No. 566,337. Patented Aug. 25, 1896.
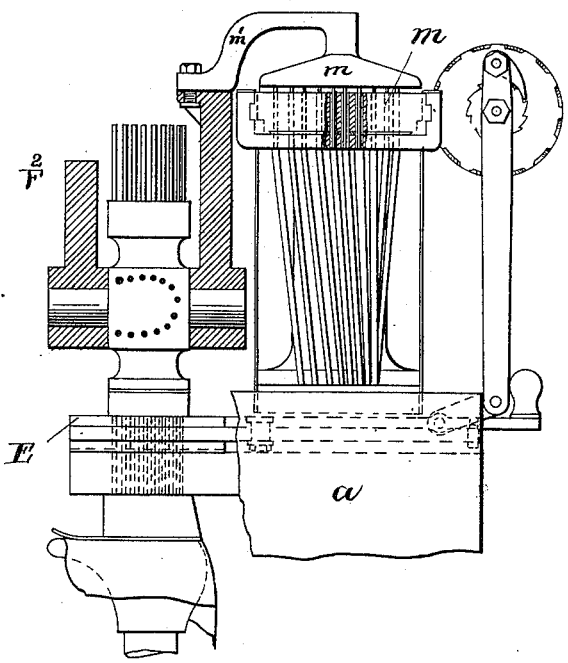
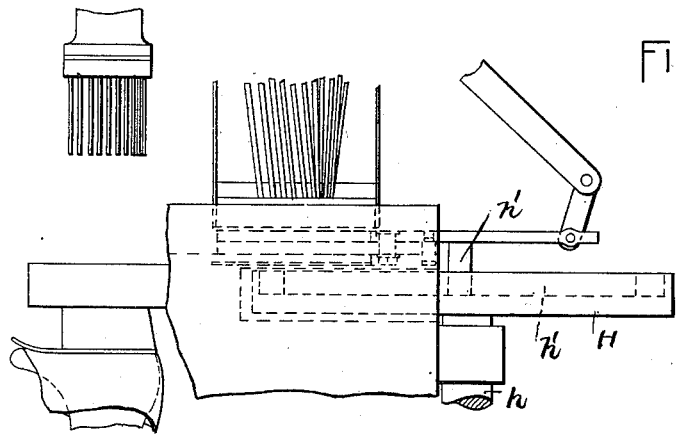
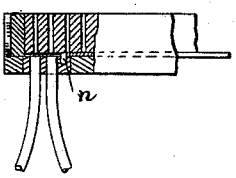
WITNESSES  INVENTOR (No Model.)  
6 Sheets—Sheet 6
F. F. RAYMOND, 2d.
NAIL DISTRIBUTING MACHINE.
No. 566,337. Patented Aug. 25, 1896.
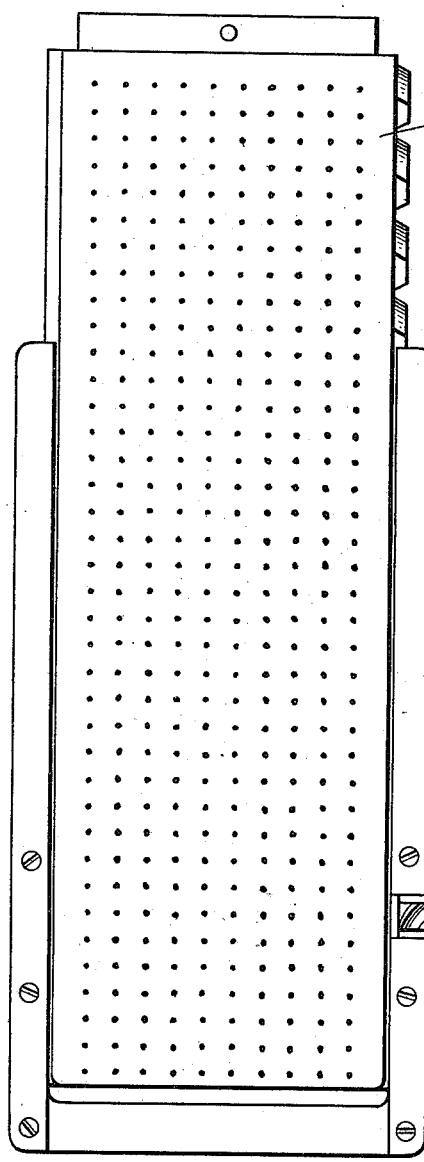
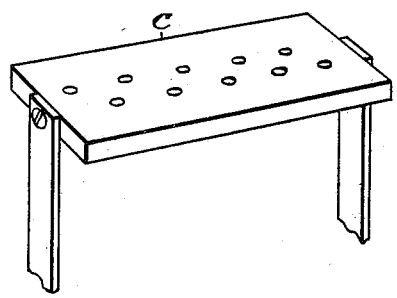
Fig. 11.
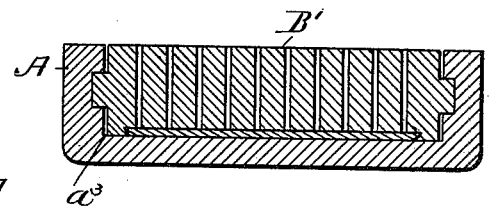
Fig. 10.
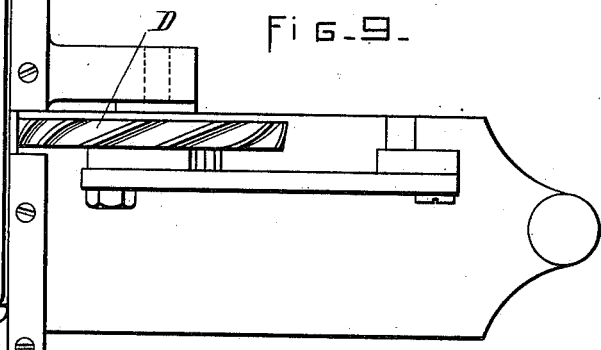
Fig. 9.
WITNESSES  
INVENTOR

UNITED STATES PATENT OFFICE.

FREEBORN F. RAYMOND, 2D, OF NEWTON, MASSACHUSETTS.

NAIL-DISTRIBUTING MACHINE.

SPECIFICATION forming part of Letters Patent No. 566,337, dated August 25, 1896.

Application filed February 20, 1892. Serial No. 422,322. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Nail-Distributing Machines, of which the following is a full, clear, and exact description, reference being had to the accompanying drawings, forming a part of the specification, in explaining its nature.

The invention relates to an improvement in nail-distributing machines; and it consists of an organization whereby a nail-supplying block or device is caused to be automatically moved to deliver nails to a nail-distributer by the action of the nail-carrier which receives the nails from the distributer and transfers them to the nail-driving devices, or to a position for delivery.

The invention further relates to various details of construction and organization, all of which will hereinafter be fully described.

I have represented in the drawings the nail-supplying device as comprising a long block or receptacle provided with holes extending through it, preferably arranged in parallel lines across it from side to side, which holes are adapted to be filled with nails. This block is fed by a carrier or slide having a worm with which an intermittently-rotated worm-wheel engages. The worm-wheel is represented as provided with this intermittent motion by means of a slide nail-carrier and a suitable connection.

Figure 2:
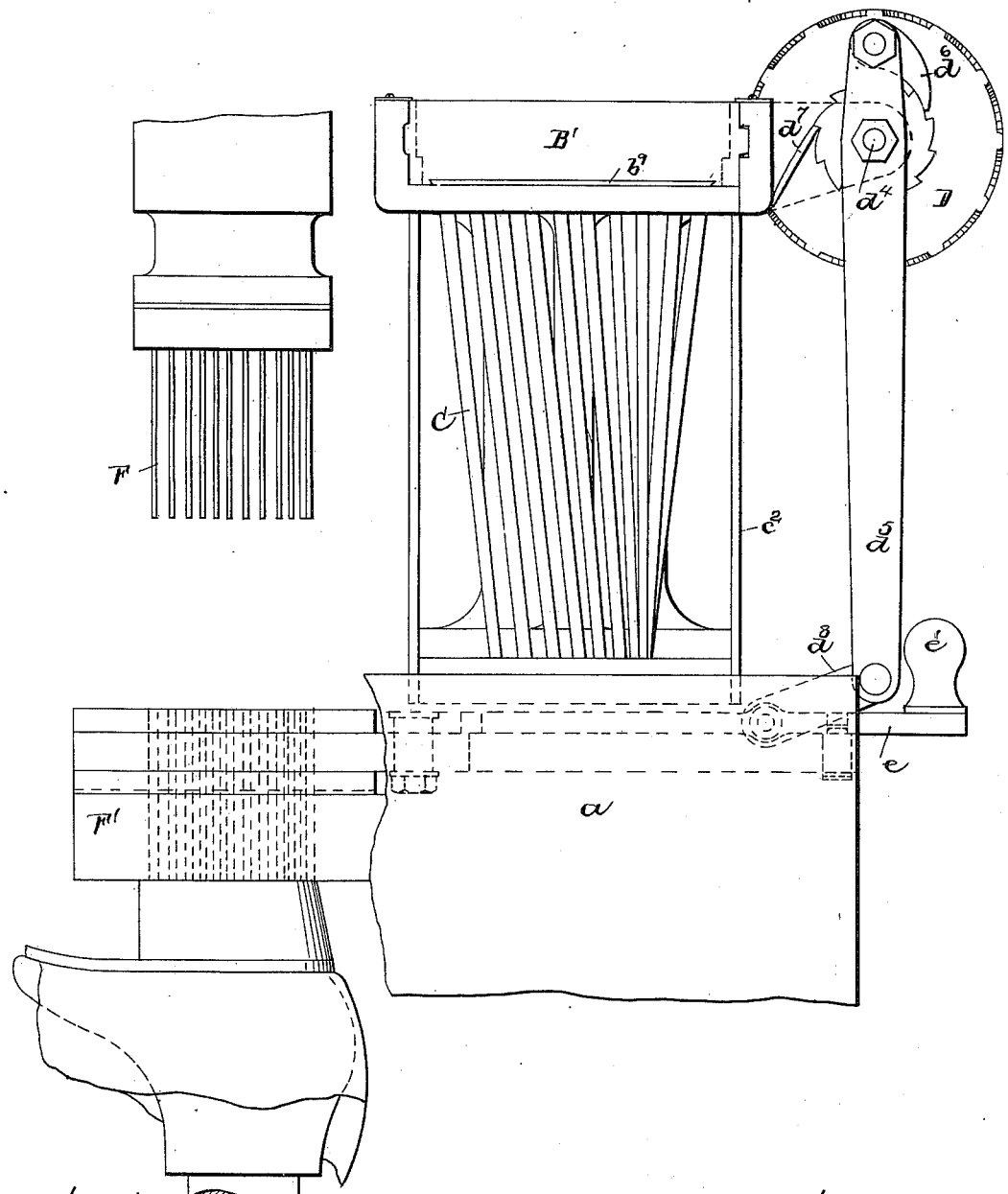
Figure 3:
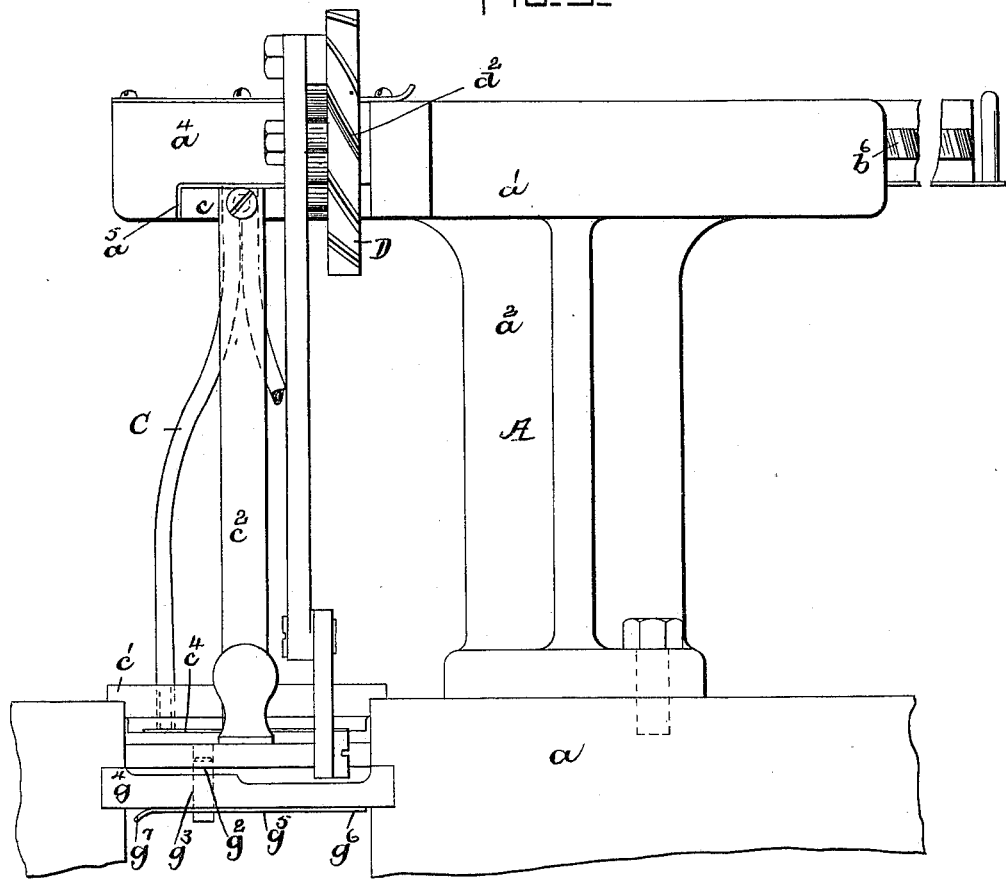

Referring to the drawings, Figure 1 is a view in end elevation of the nail-receiving block, nail-block slide, frame, distributer, slide-operating worm, and connections between it and the nail-carrier. Fig. 2 is a view, principally in side elevation, to represent the relation which the nail-supplying block, distributer, and carrier bear to the nail-driving devices. Fig. 3 is a view in rear elevation of the portion of the nail-driving machine with the nail supplying and distributing devices attached. Fig. 4 is a plan view of the nail-supplying device. Fig. 5 is a vertical section upon the dotted line of Fig. 4. Fig. 6 is a view in vertical section and end elevation to represent a gang of drivers or plungers for clearing or driving nails from the holes of the nail-supplying block. Fig. 7 is a view to represent the nail-carrier as operated by a cam automatically. Fig. 8 is a detail view to represent the method of uncovering the holes in the nail-supplying block as they are brought into line with the holes of the distributer. Figs. 9, 10, and 11 are detailed views of parts of the mechanism hereinafter referred to.

A is the frame, which is represented as bolted to the table $a$ of the nail-driving machine. Its top $a'$ extends both sides of the post $a^2$ and furnishes a slideway $a^3$, open at both ends and in which the nail-block-receiving slide B is movable. The section $a^4$ of the top has in its under surface the cross-recess $a^5$, which receives the upper plate $c$ of the nail-distributer C. The nail-block-receiving slide B is rectangular in shape and comprises the side sections $b$ $b'$ and the end sections $b^2$ $b^3$. These sections form a skeleton frame which fits the slideway $a^3$ of the frame. The side $b'$ has a tongue $b^4$, which enters a recess $b^5$ in the frame, and the side $b$ has formed upon it or secured to it a worm-rack $b^6$. The slide also has the shoulders $b^7$ for supporting the nail-holding block B'. This nail-holding block has in its under surface the dovetail recess $b^8$ to receive the imperforate hole-covering plate $b^9$, which slides in the dovetail and which serves to cover the holes during the transportation of the block and in the machine, excepting as loaded holes are brought into line with the holes of the distributer.

The block B' is of a size to drop into the skeleton frame B. It is of course understood that the frame B has no bottom.

Extending outwardly from the rear of the frame A is a lug $d$. (See Fig. 4.) This supports a cross-pin or shaft $d'$, upon which is carried the worm-wheel D, the periphery of which extends through a recess $d^{12}$ of the frame to engage the worm-rack $b^6$. There is secured to the shaft or worm D the ratchet-wheel $d^3$. There is pivoted upon the shaft $d'$ at $d^4$ a lever $d^5$. This lever carries a pawl $d^6$, which engages the teeth of the ratchet-wheel $d^3$.

To prevent the ratchet-wheel D from turning backward as the pawl is moved backward upon its teeth, there may be used a stop-spring $d^7$, fastened to the frame and arranged to engage successively the teeth of the ratchet-wheel. The lever $d^5$ in Figs. 1, 2, 3, 4, and 6 is represented as attached to a portion of the nail-carrier E by a link $d^8$. (See Fig. 1.) The nail-carrier E is adapted to be moved in suitable guides in the table $a$ of the nail-driving machine from a position under the distributer C (see Fig. 1) to a position under the drivers F. (See Figs. 2 and 6.) There is attached to the nail-carrier a rearward-extending arm $e$, having a handle $e'$, (see Figs. 1, 2, and 4,) by which the nail-carrier is moved. The distributer C comprises an upper plate $c$, which fits the recess $a^5$ of the frame A, which recess opens into the slideway, the lower plate $c'$, connecting-supports $c^2$, (see Fig. 1,) and the tubes $c^3$, which extend into or through holes in the plate $c$ to the upper surface of said plate and into or through holes extending through the plate $c'$. The holes are arranged in a straight line or in a line to correspond with the holes in the supplying-block B'. The holes in the plate $c'$ have any desired form or arrangement.

The plate $c'$ has a hole-covering plate $c^4$, which preferably is opened by a pin upon the nail-carrier E and closed by a spring in the ordinary manner. In the drawings I have shown the plate $c$ of the distributer as having two lines of holes which are parallel but not opposite each other, (see Fig. 11,) and the tubes of the distributer, of course, run to or into both these lines so that the upper ends of the tubes are also upon parallel lines but not opposite each other.

The handle of slide-plate $e$ of the nail-carrier has two registering holes $g$ $g'$. (See Fig. 1.) These holes are adapted to receive the registering-pin $g^2$, (see Fig. 3,) which is supported in a hole $g^3$ in the cross-bar $g^4$ and is moved upward by a flat spring $g^5$, fastened at $g^6$ to the bar and having a thumb end $g^7$, by which it is pushed downward from the cross-bar. The bar end of the pin is tapering or rounded, so as to automatically enter the registering holes, and the registering-pin and hole $g$ serve to lock the nail-carrier with its holes in register with the holes of the distributer. The register-pin and the hole $g'$ serve to lock the nail-carrier with its holes in register with the drivers and holes of the templet F'. (See Fig. 2.)

In Fig. 7 I have shown the nail-supplying-block slide or carriage B and the nail-carrier E as moved automatically by a cam H upon the vertical shaft $h$, forming a part of the nail-driving machine. This cam has a cam-groove $h'$, constructed to move the nail-carrier slide E from a position beneath the distributer to a position beneath the drivers and back again, and the nail-carrier slide has a cam-pin $h^2$ to enter said cam-groove. The connection between the nail-carrier slide and nail-supplying-block carriage B is the same as above specified, the difference between the two forms of the invention being that in one case the nail-carrier is moved by hand and the nail-supplying block thus caused to be actuated, whereas in the other case the nail-carrier block is moved automatically by the cam.

When the nail-supplying block is moved by the cam or automatically, I prefer to discharge the nails in successive order from the holes of the supplying-block by a gang or group of plungers or drivers M, (see Fig. 6,) carried by a supporting block or plate $m$, fastened by a bracket $m'$ to the reciprocating cross-head $F^2$ of the nail-driving machine. These drivers or plungers are arranged upon their block $m$ to enter as many of the holes of the nail-supplying block as are in register with the holes of the distributer, and upon the downward movement of the cross-head they serve to enter said holes and push therefrom any nails which have not fallen therefrom by gravity into the holes of the distributer, thus freeing the holes from any nails accidentally remaining in them and insuring against any difficulty or trouble in feeding the block B' which might otherwise arise. This is in the nature of a safety appliance, however, and is not absolutely essential to the operation of the machine.

I would say that while I prefer to make the nail-supplying block separate or distinct from the carriage B, which carries it, because of ease with which the block can be removed from the machine and another filled one substituted for it, yet it is not essential that they be so made, as the nail-carrier block itself may be made the slide or carriage and provided with the rack-teeth upon its edge to be engaged by the worm. I would also say that while the holes of the nail-supplying block are shown as alternating they may all be upon the same line, if desired. They are put into the alternating form when it is desired to deliver two lines of nails at once. Where it is desired to deliver but one line of nails at once, the holes may be arranged upon the same lines both lengthwise and crosswise the block.

In use the holes of the nail-supplying block B' are filled with nails in any desired way. The block is then dropped into the slide-carriage of the machine, and upon the movement of the nail-carrier E forward to a position to deliver nails the worm-wheel is rotated and the nail-supplying block advanced to bring the first one or two lines of its holes into register with the upper ends of the holes of the distributer, and they immediately drop from said holes or are driven or removed therefrom by the plungers M into the passages of the distributer, falling to the bottom thereof and resting upon the hole-covering plate. As the nail-supplying block is moved by the worm the front end of its hole-covering plate $b^9$ comes into contact with the pin $n$ (see Fig. 8) and is held by it stationary, while the block is moved forward or onward by successive feeding impulses. The nail-carrier slide and nail-carrier being then moved backward does not actuate the worm-wheel as the feed-pawl rides back on the ratchet-wheel, and the nail-supplying block is therefore stationary. When the nail-carrier block reaches the end of its backward movement, it moves the hole-covering plate of the distributer and permits the nails to drop from the lower ends of the holes of the distributer into its holes. It will thus be seen that upon every forward movement of the nail-carrier to deliver nails to the nail-drivers and templet, or to any driving apparatus, or to any desired place, the nail-supplying block is caused by such action to be fed forward by the worm-wheel, ratchet-wheel, and feed pawl and lever connected with the nail-carrier to bring into position and deliver into the distributer a load of nails in readiness for transfer to the nail-carrier block upon its backward movement, and that upon the backward movement of the nail-carrier a load of nails is in position to be immediately delivered to it at the end of such movement. As above intimated, this movement of the nail-carrier may be a hand movement or it may be an automatic movement.

I would say that I do not confine myself to the specific form of connection between the nail-carrier and the nail-supply block herein specified, as there may be used in lieu thereof many mechanical equivalents; but I do consider that a worm-rack and worm are especially advantageous for this use, in that they not only serve to feed the nail-supplying block a uniform distance, but they also act to hold the block locked with its holes in registering position at the end of each feed movement, acting thus not only as a feeding device but as a locking and registering device.

Having thus fully described my invention, I claim and desire to secure by Letters Patent of the United States—

1. The combination in a machine of the character specified, of a frame having a slideway, a perforated carriage or block mounted therein having a worm-rack upon its side, a worm to engage said rack and means for intermittingly rotating the worm, such as a ratchet pawl and lever, said worm, pawl and lever mounted at the upper end of the downwardly-converging distributing-tubes, and said tubes, substantially as described.

2. The combination of the frame having the slideway, a perforated block B', adapted to be moved therein, a worm-rack upon its side supporting it and a worm-wheel to engage said worm-rack, and mechanism for operating the worm mounted at the upper end of the downwardly-converging distributing-tubes, and said tubes, substantially as described.

3. The combination in a machine of the character specified of the slideway, a carriage or slide adapted to have an intermittent movement imparted to it, and a removable block having receiving holes or perforations mounted above a series of downwardly-converging distributing-tubes, and said tubes, as and for the purposes described.

4. The combination of a frame having the slideway, an intermittently-movable slide-carriage having an opening extending through it, a removable block held in said opening having holes extending through the same and a movable hole-cover plate mounted above a series of downwardly-converging distributing-tubes, and said tubes, substantially as described.

5. The combination of a frame having the slideway, a carriage movable therein and carrying a block having receptacles adapted to be filled with nails, a cover-plate for said block and a stop for holding said plate stationary during the movement of said slide and block mounted above a series of downwardly-converging distributing-tubes, and said tubes, substantially as described.

6. The combination of a movable block having holes or receptacles, a distributer, a carrier and block-actuating mechanism connected with said carrier, whereby the movement of the carrier causes the movement of the block, said mechanism mounted at the upper end of the downwardly-converging distributing-tubes, and said tubes, substantially as described.

7. The combination of a frame having a slideway, a block movable in said slideway, having holes or receptacles for holding nails or fastenings, a cover-plate for said block, a distributer beneath said block into the holes of which the nails or fastenings from said block are delivered, a cover-plate at the bottom of the distributer for covering the holes therein, a nail-supplying-block actuating mechanism connected with said nail-carrier and organized to be operated upon the forward movement of said nail-carrier whereby the nail-supplying block is fed forward and nails delivered to the distributer during the forward movement of the nail-carrier and is held stationary during the backward movement of said nail-carrier and the nails delivered from the nail-distributer to the nail-carrier at the end of its backward movement, substantially as described.

8. The combination of the nail-carrier, its slide or handle, stops for latching the carrier in operative relation with the distributer and operative relation to the nail-driving devices, a nail-supplying block, its operative mechanism connected with the nail-carrier to be actuated thereby and the distributer, substantially as described.

FREEBORN F. RAYMOND, 2D.

In presence of—
    J. M. DOLAN,
    M. McFAGUE.